US010325241B2

(12) United States Patent
Haimi

(10) Patent No.: US 10,325,241 B2
(45) Date of Patent: Jun. 18, 2019

(54) SYSTEM AND METHOD FOR TRACKING SHELF-LIFE AND AFTER-OPENING USAGE LIFE OF MEDICAMENTS, FOODS AND OTHER PERISHABLES

(71) Applicant: Shlomo Uri Haimi, Or Akiva (IL)

(72) Inventor: Shlomo Uri Haimi, Or Akiva (IL)

(*) Notice: Subject to any disclaimer, the term of this patent is extended or adjusted under 35 U.S.C. 154(b) by 669 days.

(21) Appl. No.: 14/798,490

(22) Filed: Jul. 14, 2015

(65) Prior Publication Data
US 2017/0017919 A1 Jan. 19, 2017

(51) Int. Cl.
G06Q 10/00 (2012.01)
G06Q 10/08 (2012.01)
G06Q 10/06 (2012.01)

(52) U.S. Cl.
CPC ..... G06Q 10/087 (2013.01); G06Q 10/06315 (2013.01)

(58) Field of Classification Search
USPC ................................. 705/7.25, 7.31
IPC .................................. G06Q 10/06315
See application file for complete search history.

(56) References Cited

U.S. PATENT DOCUMENTS 5,671,362 A * 9/1997 Cowe .................. G06Q 10/087
340/5.92
5,950,630 A * 9/1999 Portwood ........... G06F 19/3456
128/897
6,294,997 B1 * 9/2001 Paratore ............. G06K 19/0717
235/385
7,467,093 B1 * 12/2008 Newton ............... G06F 19/3462
705/3
7,495,558 B2 * 2/2009 Pope ...................... G01K 1/024
340/572.1

(Continued)

FOREIGN PATENT DOCUMENTS

WO WO-2015013031 A2 * 1/2015 ............ G06Q 30/02
WO WO-2015143200 A1 * 9/2015 ............... G06F 1/14

OTHER PUBLICATIONS

Reiner Jedermann and Walter Lang (Semi-passive RFID and beyond: steps towards automated quality tracing in the food chain, Int. J. Radio Frequency Identification Technology and Applications, vol. 1, No. 3, 2007). (Year: 2007).*

(Continued)

*Primary Examiner* — Hafiz A Kassim
(74) *Attorney, Agent, or Firm* — Mark M. Friedman

(57) ABSTRACT

A computer-implemented method and system for monitoring a life-cycle of a product, the method including executing on a processing unit, instructions to perform: receiving an electronic manufacture notification from a manufacturer, via a network, including a manufacturing time, the manufacturing time indicating a time of manufacturing of the product; calculating a shelf-life expiration date based on an estimated shelf-life and the manufacturing time of the product; receiving an electronic scanning notification from a scanning device, via a network, including a modification time indicating a time of modification of the product from a preserved state to a non-preserved state; calculating a usage expiration date based on an estimated length of time the product is usable in the non-preserving state and the modification time; sending notification of the shelf-life expiration date to the scanning device; sending notification of the usage expiration date to the scanning device.

24 Claims, 8 Drawing Sheets

(56) References Cited

U.S. PATENT DOCUMENTS

| | | | | |
|---|---|---|---|---|
| 8,447,665 B1* | 5/2013 | Schoenharl | | G06Q 10/087 235/379 |
| 8,833,654 B1* | 9/2014 | Grant | | G06Q 10/0833 235/383 |
| 9,436,853 B1* | 9/2016 | Meyers | | G06K 7/0008 |
| 2002/0016739 A1* | 2/2002 | Ogasawara | | G06K 17/00 705/22 |
| 2002/0101197 A1* | 8/2002 | Lys | | H05B 33/086 315/291 |
| 2002/0143598 A1* | 10/2002 | Scheer | | G06Q 10/06 705/7.26 |
| 2003/0055667 A1* | 3/2003 | Sgambaro | | G06Q 30/018 705/317 |
| 2003/0078741 A1* | 4/2003 | Storino | | G06Q 30/02 702/34 |
| 2003/0135431 A1* | 7/2003 | Schwartz | | G06Q 10/087 705/28 |
| 2003/0171963 A1* | 9/2003 | Kurihara | | G05B 19/41865 703/10 |
| 2003/0216969 A1* | 11/2003 | Bauer | | G06K 7/0008 705/22 |
| 2004/0148117 A1* | 7/2004 | Kirshenbaum | | G01K 1/022 702/82 |
| 2005/0021279 A1* | 1/2005 | Kuepper | | G01D 9/005 702/127 |
| 2005/0021561 A1* | 1/2005 | Noonan | | G06Q 10/087 |
| 2005/0035860 A1* | 2/2005 | Taylor | | G06K 7/0008 340/572.1 |
| 2005/0038860 A1* | 2/2005 | Helal | | A61B 5/0062 709/206 |
| 2005/0049958 A1* | 3/2005 | Macolino | | G06Q 10/06 705/37 |
| 2005/0222894 A1* | 10/2005 | Klein | | G06Q 10/063 705/7.11 |
| 2005/0224577 A1* | 10/2005 | Rozenblat | | G06Q 10/06 235/385 |
| 2005/0258961 A1* | 11/2005 | Kimball | | G06Q 10/087 340/572.1 |
| 2006/0242154 A1* | 10/2006 | Rawat | | G06F 17/30126 |
| 2007/0221727 A1* | 9/2007 | Reznik | | G06Q 10/08 235/383 |
| 2007/0235528 A1* | 10/2007 | Spencer | | G06Q 10/087 235/383 |
| 2007/0258048 A1* | 11/2007 | Pitchers | | G06K 17/00 353/26 R |
| 2007/0275467 A1* | 11/2007 | Louvet | | C12Q 1/02 436/2 |
| 2008/0059228 A1* | 3/2008 | Bossi | | G06F 19/3418 705/2 |
| 2008/0184719 A1* | 8/2008 | Lowenstein | | F25D 29/00 62/127 |
| 2008/0255874 A1* | 10/2008 | Crooks | | A61J 7/0481 705/2 |
| 2009/0272806 A1* | 11/2009 | Kemp | | B23K 26/03 235/462.1 |
| 2010/0245080 A1* | 9/2010 | Liang | | G04G 15/006 340/540 |
| 2011/0054935 A1* | 3/2011 | Hardaway | | G06F 19/328 705/3 |
| 2012/0089249 A1* | 4/2012 | Rosenblum | | G06F 19/3462 700/225 |
| 2012/0187185 A1* | 7/2012 | Sayan | | G06Q 30/0601 235/375 |
| 2012/0236900 A1* | 9/2012 | Hubbard | | G01K 3/04 374/102 |
| 2012/0330665 A1* | 12/2012 | Berkun | | G06F 19/3462 704/260 |
| 2013/0035950 A1* | 2/2013 | MacDonald | | G06Q 50/22 705/2 |
| 2013/0085771 A1* | 4/2013 | Ghanbari | | G06Q 10/103 705/2 |
| 2013/0209615 A1* | 8/2013 | Lee | | G06Q 10/087 426/88 |
| 2013/0309138 A1* | 11/2013 | Minvielle | | A61J 1/00 422/105 |
| 2014/0165614 A1* | 6/2014 | Manning | | F25D 29/008 62/62 |
| 2015/0186836 A1* | 7/2015 | Chouhan | | G06F 16/9535 705/28 |
| 2016/0012337 A1* | 1/2016 | Kaye | | G06Q 10/08 706/12 |
| 2016/0098524 A1* | 4/2016 | Himmelstein | | G06F 19/327 705/2 |

OTHER PUBLICATIONS

Kenneth C. Waterman, Anthony J. Carella, Michael J. Gumkowski, Patrick Lukulay, Bruce C. MacDonald, Michael C. Roy, and Sheri L. Shamblin (Improved Protocol and Data Analysis for Accelerated Shelf-Life Estimation of Solid Dosage Forms, Pharmaceutical Research, vol. 24, No. 4, Apr. 2007 (2007) (Year: 2007).*

James J. Chen and Hongshik Ahn (Shelf-Life Estimation for Multifactor Stability Studies, Drug Information Journal, vol. 31, pp. 573-587, 1997) (Year: 1997).*

Ismail Uysal, Jean-Pierre Emond, and Gisele Bennett Tag Testing Methodology for RFID Enabled Temperature Tracking and Shelf Life Estimation, IEEE Int'l Conf. on RFID—Technologies and Applications, 2011). (Year: 2011).*

C. Condurso, A. Verzera, V. Romeo, M. Ziino, F. Conte (Solid-phase microextraction and gas chromatography mass spectrometry analysis of dairy product volatiles for the determination of shelf-life, ScienceDirect, International Dairy Journal 18 (2008) 819-825). (Year: 2008).*

Martin Grunow, Selwyn Piramuthu (RFID in highly perishable food supply chains—Remaining shelf life to supplant expiry date? ScienceDirect, Int. J. Production Economics 146 (2013) 717-727) (Year: 2013).*

Dong Li . Dennis Kehoe . Paul Drake Dynamic planning with a wireless product identification technology in food supply chains, Int J Adv Manuf Technol (2006) 30: 938-944) (Year: 2006).*

* cited by examiner

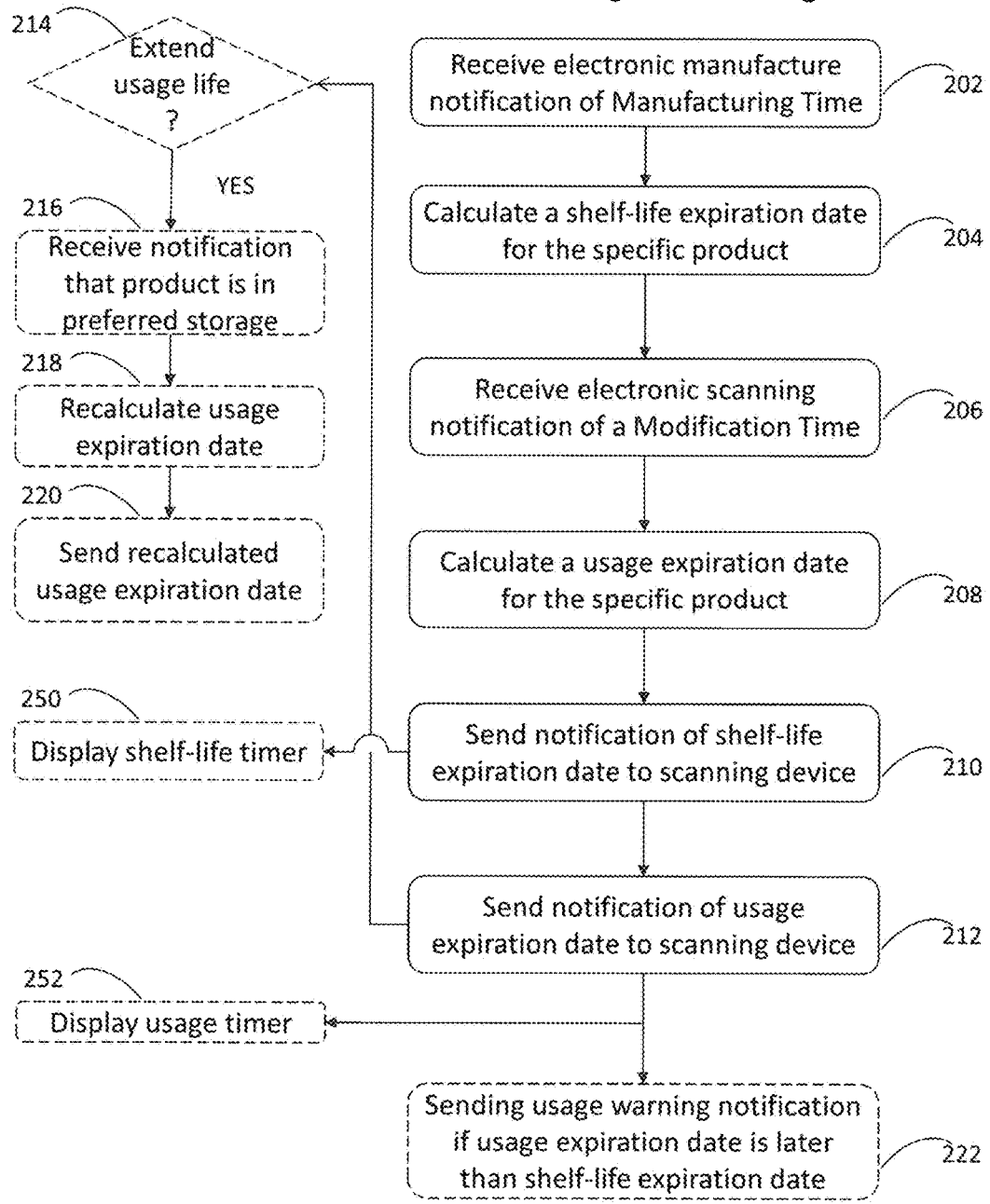

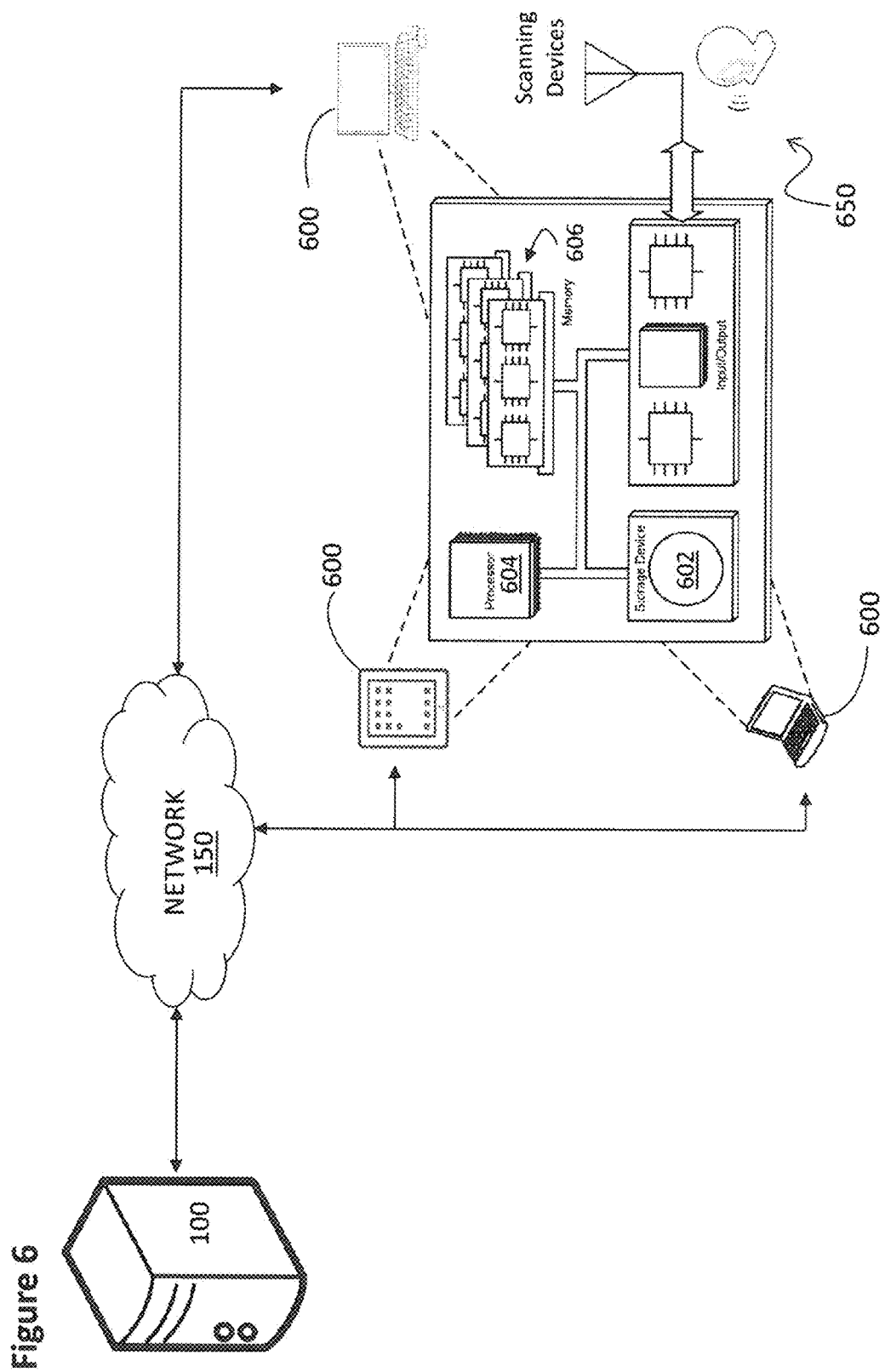

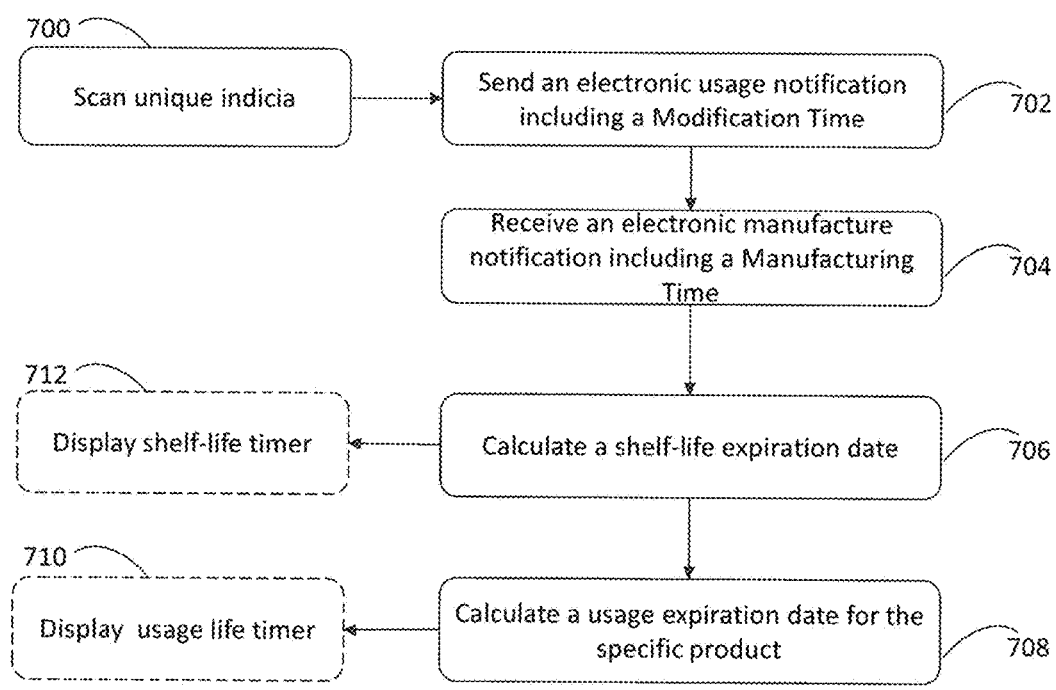
Client Side Flow Diagram    Figure 7

SYSTEM AND METHOD FOR TRACKING SHELF-LIFE AND AFTER-OPENING USAGE LIFE OF MEDICAMENTS, FOODS AND OTHER PERISHABLES

FIELD OF THE INVENTION

The present invention relates to a method and system for tracking the life-span of a product such as a medicine and, more particularly, to an application for tracking not only the expiration date of a medicine (or food stuff) based on the shelf life, but also the expiration from a time of opening the medicine.

SUMMARY OF THE INVENTION

According to the present invention there is provided a method and system for tracking not only the expiration date of a medicine (food stuff or other perishable) based on the shelf life, but also the expiration from a tune of opening/first using the medicine or perishable (e.g. cosmetics, chemicals, toothbrushes etc.)—i.e. the beginning of use of the object—until the object is no longer usable.

According to the present invention there is provided a computer-implemented method for monitoring a life-cycle of a product, the method including executing on a processing unit, instructions to perform: receiving an electronic manufacture notification from a manufacturer, via a network, including a manufacturing time, the manufacturing time indicating a time of manufacturing of the product; calculating a shelf-life expiration date based on an estimated shelf-life and the manufacturing time of the product; receiving an electronic scanning notification from a scanning device, via a network, including a modification time indicating a time of modification of the product from a preserved state to a non-preserved state; calculating a usage expiration date based on an estimated, length of time the product is usable in the non-preserving state and the modification time; sending notification of the shelf-life expiration date to the scanning device; sending notification of the usage expiration date to the scanning device.

According to further features in preferred embodiments of the invention described below the electronic scanning notification is received each time a unique indicia operationally coupled to the product is scanned by the scanning device, the electronic scanning notification further including at least a unique device identifier of the scanning device.

According to still further features in the described preferred embodiments the scanning device is selected from a group of scanning devices belonging to a manufacturer, an importer, a wholesaler and a retailer.

According to still further features the method further includes prompting the wholesaler/retailer/end-user to send a resupply request when inventory of the product is low; receiving the resupply request from the wholesaler/retailer/end-user; and sending the resupply request to the manufacturer/wholesaler/retailer.

According to still further features the method further includes prompting an end-user to request a replacement for the product when the product fulfils a condition selected from the group including: the shelf-life expiration date is within a first predefined number of days, the usage expiration date is within a second predefined number of days, and a final date of consumption of the product is within a third predefined number of days.

According to still further features the method further includes sending a usage warning notification if the usage expiration date is later than the shelf-life expiration date, the usage warning notification including a warning message, wherein the usage warning notification is sent to at least one of: the scanning device, a care-giving entity, and a statistical database.

According to still further features the method further includes tracking the product based on location data the location data relating to a geographical location of the scanning device and included in the electronic scanning notification.

According to still further features the prompting an end-user to extend the estimated usage life by placing the product in a preferred storage environment; receiving notification from the scanning device that the product is located in the preferred storage environment; recalculating the usage expiration date based on the preferred storage environment; and sending notification to the scanning device including a recalculated usage expiration date.

According to still further features the unique indicia, when scanned, maps back to a network address corresponding to a computer, the computer comprising a processor and memory, the memory having a database stored thereon including a data entry corresponding to the unique indicia.

According to still further features the data entry includes at least one of prescribing information, a dosage regimen, and compliance information.

According to still further features the method further includes prompting an end-user to display the prescribing information on the scanning device, and/or prompting an end-user to initiate a text-to-audio conversion of the prescribing information; converting the prescribing information to an audio output of the prescribing information; and transferring the audio output to the scanning device.

According to still further features the method further includes receiving the dosage regimen from a third party.

According to still further features the method further includes sending a reminder notification to the scanning device when a dosage of the product is due to be taken, the reminder notification configured according to the dosage regimen.

According to still further features the method further includes prompting the scanning device for confirmation that the dosage has been taken; updating the compliance information when the confirmation is received; and sending an additional the reminder notification to the scanning device if a predefined time-period has elapsed prior to receiving the confirmation.

According to still further features the method further includes sending a non-compliance message to a predefined entity if a second predefined time-period has elapsed prior to receiving the confirmation.

According to still further features the method further includes checking for drug intention between the product and each of at least one additional medicament for which a respective electronic usage notification has been received from the seaming device and for which neither a respective the shelf-life expiration date, nor a respective the usage expiration date has arrived.

According to still further features the method further includes displaying a usage tuner, the usage timer configured to run from the modification time for a length of time substantially equal to the estimated length of time the product is usable in the non-preserved state and/or displaying a shelf-life timer, the shelf-life timer configured to run from the manufacturing time for a length of time substantially equal to the estimated shelf-life of the product.

According to another embodiment there is provided a system for monitoring a life-cycle of a product, the system including a server computer including a processor; and a client computing device, the client computing device including a scanning component, a processing unit and a memory, the server computer communicable with the client computing device over a network, the memory having program code stored thereon that when executed, in response to the scanning component scanning a unique code on the product, instructs the processing unit to: send an electronic usage notification, via the network, to the server computer, the usage notification including a modification time indicating a time of modification of the product from a preserved state to a non-preserved state; receive an electronic manufacture notification, via the network, including a manufacturing time the manufacturing time indicating a time of manufacturing of the product; calculate a shelf-life expiration date based on an estimated shelf-life and the manufacturing time of the product; calculate a usage expiration date based on an estimated length of time the product is usable in the non-preserving state and the modification time.

According to still further features the memory having program code stored thereon that when executed, instructs the processing unit to: display a usage timer, the usage timer configured to run from the modification time for a length of time substantially equal to the estimated length of time the product is usable in the non-preserved state.

According to still further features the memory having program code stored thereon that when executed, instructs the processing unit to: display a shelf-life timer, the shelf-life timer configured to run from the manufacturing, time for a length of time substantially equal to the estimated shelf-life of the product.

BRIEF DESCRIPTION OF THE DRAWINGS

Various embodiments are herein described, by way of example only, with reference to the accompanying drawings, wherein:

FIG. 6 is a block diagram of client side devices interacting with a server computer;

FIG. 7 is a flow diagram of an embodiment of the client-side process.

DESCRIPTION OF THE PREFERRED EMBODIMENTS

The principles and operation of a system and method for monitoring a life-cycle of a product according to the present invention may be better understood with reference to the drawings and the accompanying description.

Figure 1:
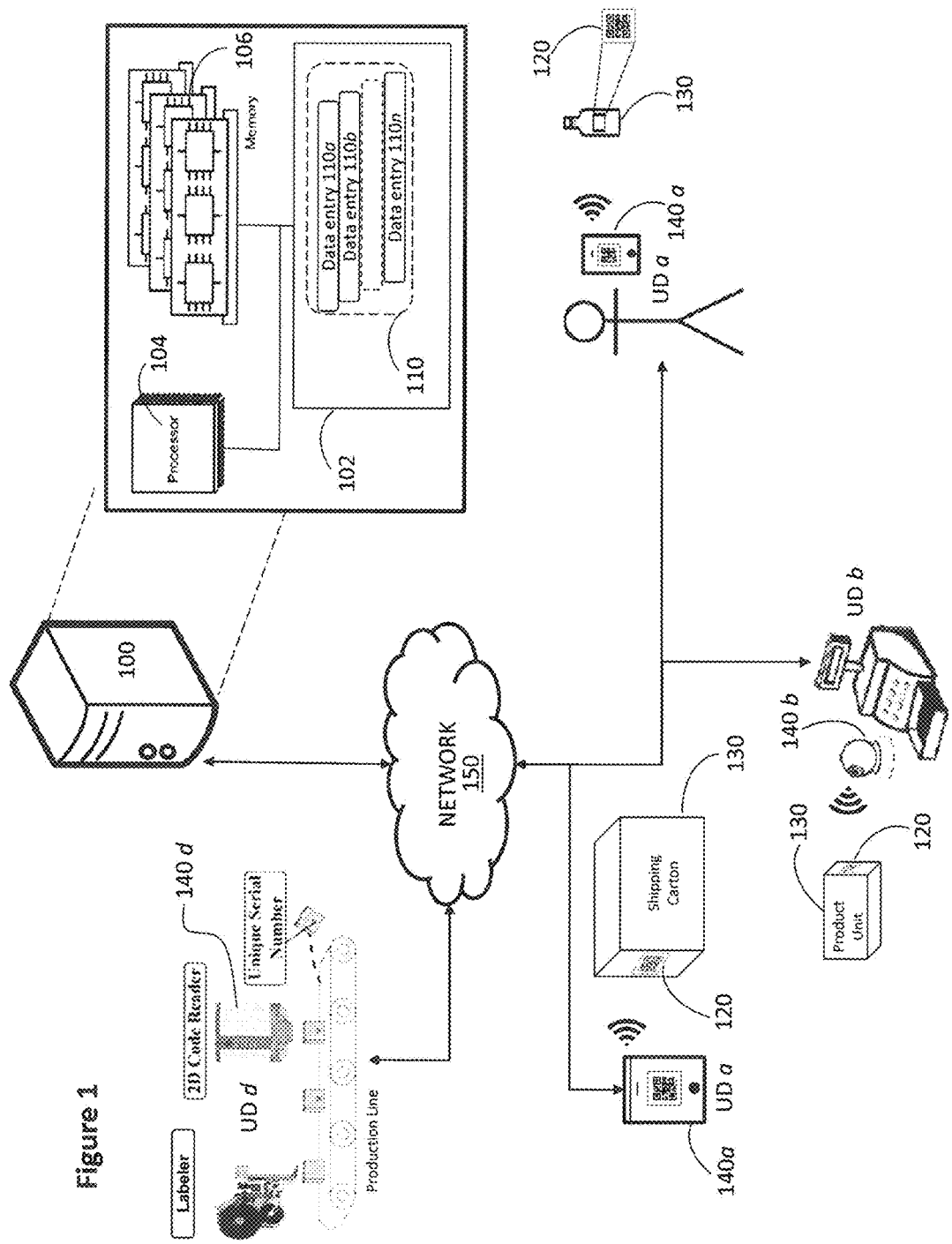
FIG. 1 is a diagram of an embodiment of the system of the immediate invention.

Referring now to the drawings, FIG. 1 illustrates a diagram of an embodiment of the system of the immediate invention. The system includes one or more serve (s) are provided remotely and accessible via a network 150, such as the Internet, the Public Switch Telephone Network (PSTN), a cellular network, or others known to those skilled in the art. For example, a series of servers corresponding to a web server, an application server, and a database server may be used. These servers are all represented by server 100.

Server computer 100 hosts, or is operationally coupled to, at least a database 110 of records that are each identified by a unique identifier. The database is stored on a computer-readable, non-volatile storage medium 102 which is operationally coupled to, and managed by a processor 104 coupled to a memory 106. Each identifier is related to a unique code (or other indicia) 120 that is primed on a product package 130.

The indicia may be a barcode, a Quick Response (QR) code, an RFID tag, an NFC tag or any similar indicia (including printed electronics). For purposes of clarity, the aforementioned indicia are referred to hereinafter as "unique scan-able codes", "unique codes", "scan-able codes" or simply "codes", and variations thereof. It is also made clear that the scan-ability of the code is optional, if preferred but that the codes can equally refer to a series of characters that can be manually entered into a computing device.

The server is in communication with client side user devices UDa ... UDn 140a ... n over communications network 150. User devices UD a ... n are computing devices, such as a telephone, a computer (desktop, laptop, tablet, handheld, etc.), a personal digital assistant (PDA), a smart phone and the like, each of which are capable of scanning, or otherwise electronically capturing, and transmit scan-able indicia. User device 140 is capable of scanning the scan-able codes. The user device is employed to scan the scan-able codes on the product packaging. Once a scan-able code has been scanned, the device relays the data that was captured by scanning the code, to the server, via a network 150.

Various parameters determine what the server will do with the data. One parameter is the scanning device. When a device scans a scan-able code, the device transmits the data from the code to the server together with a device identifier. An example of a device identifier is a Media Access Control (MAC) address. (A MAC address is a unique identifier assigned to network interfaces for communications on the physical network segment.) As such, the server knows which device scanned the code. The server computer is connected, via the network, to a manufacturing or packaging facility that prints the unique scan-able codes on the product packaging. The manufacturing (and/or packaging) facility also has a computer terminal or interface UDc 140 that can connect with the server computer of the immediate system and either feed data to the server or access data stored on the server, such as data regarding the unique identifiers (and related records) stored on the server.

In one embodiment, the server includes a database of records identified by the unique identifiers. The term "record" is used herein to refer to a basic data structure or collection of elements. The term is used interchangeably herein with terms such as "a data entry", "a data field" "a file" or variations thereof.

Preferably, the record also includes additional information on the product which carries the corresponding unique scan-able code. For example, the product can be a medicine such as eye drops for a bacterial infection. The data entry includes information relating to the medicine in general and the specific unit in particular. This data may be stored on the server and transferred to the manufacturer interface, or vice versa.

In exemplary one embodiment, the central server allots a batch of unique identifiers to the manufacturer for application to a batch of product units (e.g. bottles of eye drops). The manufacturer then prints unique codes on each of the product units (and/or on the outer packaging thereof). Each code already corresponds to one of the unique identifiers in the batch. Alternatively, each code is logically linked to one of the unique identifiers at the time of manufacture (or packaging—if these processes are distinct).

In an alternative embodiment, the manufacturing server or interface generates the unique identifier and logically links the identifiers to the scan-able codes. Once the codes have been printed, the unique identifiers are sent to the central server for storage and further use, as will be described below.

In either of the two aforementioned embodiments additional information coir be added to the records represented by the unique identifiers, either at the central server or at the manufacturing server/interface. As such, once the codes exist, a corresponding data entry or record also exists and can be accessed using the unique identifier corresponding to the code.

The code may be printed directly on the product unit (e.g. if the product unit is art aluminum can of soda) using inkjet printing known in the art. Alternatively, the code may be printed on the product label, which is stuck on the product unit during the manufacturing/packaging process. Alternatively or additionally, the code may be printed on the unit packaging (e.g. the box in which a bottle of cough syrup is packaged), into which the product unit is inserted. In the first stage of the process, the scan-able code is scanned at the manufacturing and/or packaging facility after the code and the product-unit have been coupled together (in any of the aforementioned manners or some similar manner).

In a preferred embodiment, the manufacturer (this term loosely refers to both the manufacturer and a sub-contracted packaging service that works with or fix the manufacturer) UDc 140c scans the code on the product unit as part of the manufacturing, process. In other embodiments, the manufacturer can send notification that the product has been manufactured and/or packaged and that the unique scan-able code has been operationally coupled to the product).

The Figure further illustrates a wholesaler UDd 104d scanning unique QR code of a shipping carton 130 including a plurality of product units. Typically a wholesaler sells a batch of product units which are packaged together (e.g. in a shipping carton). A retailer purchases the batch of product units from the wholesaler. The retailer is the entity responsible for the Point of Sale (POS) where a single product unit is transferred (usually as pan of a sale) to art end-user. In some embodiments, the product unit 130 is scanned by the POS user device UDb 140b. Finally, at the time of use, the end-user scans the product unit unique code, depicted in the Figure as a QR code 120, with an end-user device UDa 140a. When the end-user scans the code, the code maps back to a network address corresponding to the server 100 and specifically to the data entry corresponding to the unique code.

Figure 2:
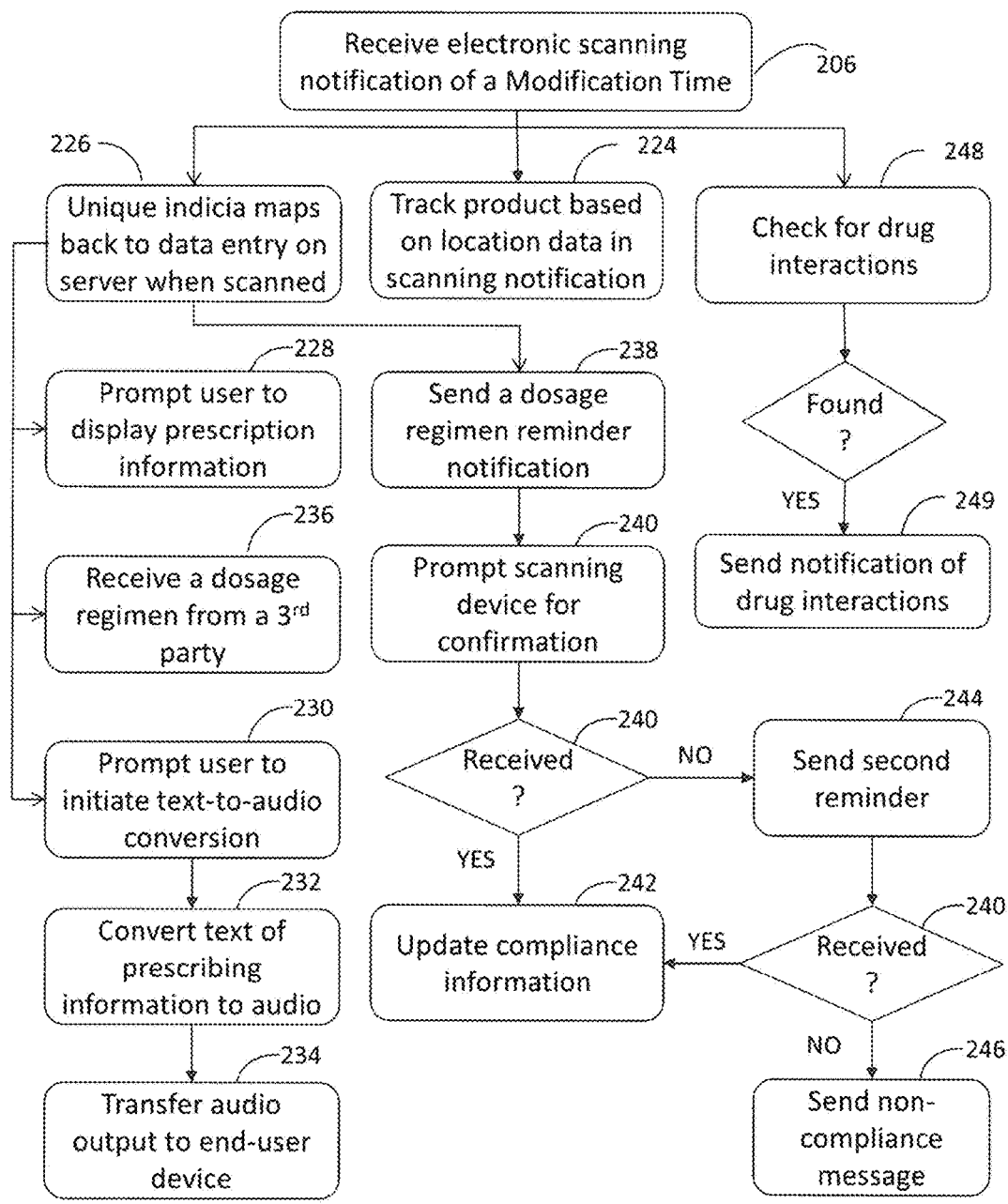
FIG. 2 is a server-side flow diagram relating to some of the elementary process steps of the immediate invention.

FIG. 2 illustrates a server-side flow diagram relating to some of the elementary process steps of the immediate invention. The flow diagram depicts a process whereby the system tracks and monitors the life-cycle of a specific product unit. As mentioned above, when the product is first manufactured and packaged, the unique code is operationally coupled to the product. As part of the manufacturing packaging process, each code is scanned (e.g. as the product passes a scanning device while on a conveyer belt of the production line).

In step 202 of the server-side process, the central server receives an electronic manufacture notification (e.g. as a result of the product code being scanned) from the manufacturer, is the network, informing the central server that the product unit, including the unique scan-able code, is now actively in circulation.

In some embodiments, the notification can further include additional data relating to the product unit. In other embodiments, some or all of the aforementioned additional data is otherwise entered, transferred and/or stored in the record or data entry. In some embodiments, the additional data includes a Manufacturing Time, such as a date and/or hour. In some embodiments, the data includes the location where the product was manufactured and/or packaged and/or scanned, should these locations be different from each other. In some embodiments, the data includes an estimated shelf-life of the product.

In preferred embodiments, the additional data includes information relevant to the product. Exemplarily, information relevant to the product may include: a list of ingredients or compounds found in the product, storage information, safety information such as special handling, storage, disposal and/or usage instructions, recommended or require usage and/or dosage quantities as well as a recommended regimen for use, application or consumption of the product.

Figure 4:
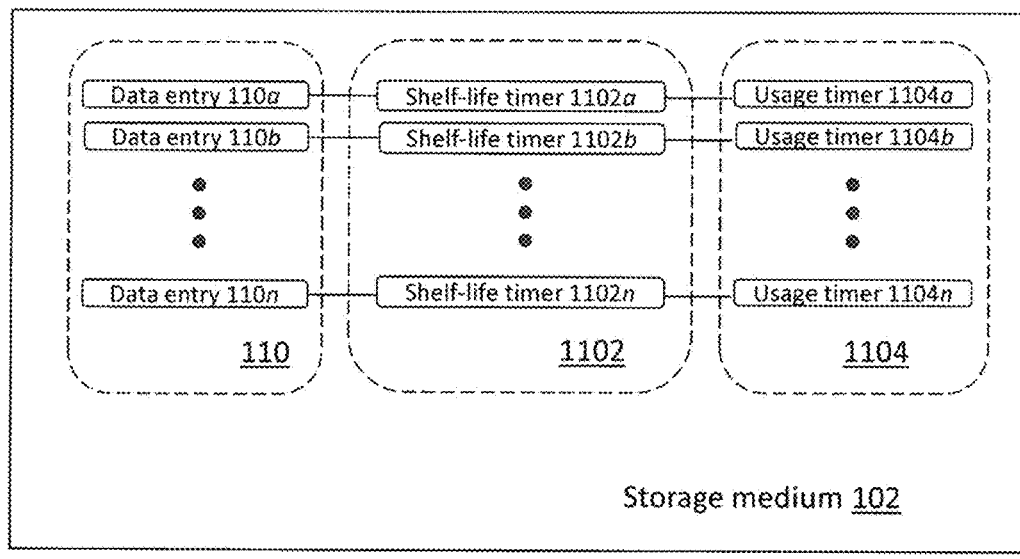
FIG. 4 is a block diagram of the records database stored on storage medium.

As mentioned above, the central server includes a memory and a storage medium configured to store computer-readable instructions. FIG. 4 illustrates a block diagram of the records database 110 stored on storage medium 102. One or more databases may be integrated directly into storage medium 102 or may be provided separately therefrom and remotely from the server 100. The databases or modules may be any organization of data on one or more data storage media, such as one or more servers. The storage media are collectively referred to herein is storage medium 102.

In the case of a remote access to the databases, access may occur via any type of network 150, as indicated above. The various databases, module and engines described herein may be provided as collections of data or instructions organized for rapid search and retrieval by a computer and execution by a processor. They are structured to facilitate storage, retrieval, modification, and deletion of data in conjunction with various data-processing operations and execution of the instructions by one or more processors. The one or more processors may be collocated or remoted located. The one or more processors are collectively referred to herein as processor 104.

In some embodiments, the storage medium 102 further includes a Shelf-Life Timer 1102 or other, similar, timer or counter a iodide, stored thereon. The shelf-life timer is configured to run a counter for a period of time equal to an estimated shelf-life of the specific product. In some embodiments, each product-unit has a dedicated shelf-life timer 1102a ... n that is configured according to the shelf-life of the individual product-unit. In practice, a given batch of product units that are manufactured at substantially the same time (e.g. within a predefined one-hour timeframe, 12-hour timeframe or 24-hour timeframe etc.) can be assigned, linked or otherwise operationally coupled to a single timer.

Instructions for the shelf-life timer are loaded into memory and the counter is initiated by the processor. In some embodiments the timer is initiated in response to the notification from the manufacturer, in other embodiments, the timer is initiated based on the manufacture time information stored in the data entry. In still other embodiments, the timer is initiated in response to the notification and corrected based on the manufacture time information in the data entry.

The latter embodiment may be particularly relevant in cases where the notification is received at a significantly later time that the manufacture time. What is considered a significant amount of time is relative to the nature of the product unit. For one product a discrepancy of single day between manufacture and notification is significant, whereas with another product even a discrepancy of a week is not significant.

Referring back to FIG. 2, in step 204 of the server process, the system calculates a shelf-life expiration date for the specific product. The shelf expiration date is calculated based on the estimated shelf-life of the product and the manufacturing time (i.e. the time that the product was manufactured).

The product unit leaves the manufacturing or packaging facility and is shipped, transferred or otherwise transported to a retailer. In most scenarios, the product unit passes through many hands before reaching the retailer. For example, the product may be shipped to an exporter and/or a wholesaler (or other such intermediaries) before reaching the retailer (see below for a more detailed discussion of the intermediaries).

Once at the retailer, which is understood to be the point of sale (POS) of the product unit to the end-user, the code on the product unit is once again scanned. The code may be scanned more than one time in almost all situations, the product-unit is scanned at least once, at the time of sale to the end-user. When the code is scanned, or otherwise inputted into the retailer system, a log entry is made in the retailer system relating to the sale of the product unit. In legacy systems, barcodes are generic to a product, but not to each unit of that product. As such, retailer systems that track inventory simply show that one unit of the store inventory of the same product has been sold.

In a preferred embodiment, the POS scans the code and transmits a notification to the central server, via a network such as the internet, indicating that the specific product unit (having the unique code that was scanned) has been sold. In some embodiments, the notification can include additional data, if applicable. The central server receives the aforementioned notification and stores the data for further use. Exemplarily, the notification and/or additional data sent with the notification include location data relating to a geographical location in which the unique code was scanned (i.e. the geographical location of the POS). In most cases the device identifier that is sent together with the notification is known to the system. In such cases, even without location data, the system is still able to track the product to the POS. The data can be used to geographically track the product unit for various uses such as statistical purposes, fraud prevention, data mining and various other purposes (see below).

Opening the packaging of a product (or otherwise preparing a product for use) is a significant milestone in the life-cycle of a perishable product such as a food stuff or medicament. Many perishable products are packaged in a manner that extends the viable use-life of the product. This is a well-known concept. One method of packaging that extends the life of a product is vacuum packing. Vacuum packing reduces atmospheric oxygen, limiting the growth of aerobic bacteria or fungi, and preventing the evaporation of volatile components. An alternative is to replace the interior gas with nitrogen. This has the same effect of inhibiting deterioration due to the removal of oxygen. Another method of preservation is dehydration. The shelf-life of a product can be significantly extended when the product is dehydrated. Powdered milk is one example of preservation through dehydration. At the time of manufacture, many products are placed in a state of preservation. The state of preservation may be storage in a preserving environment (e.g. vacuum packaging) or in a preserving form (e.g. dehydration).

One primary function of the immediate system is to track the usage of product by the end-user. The immediate system is adapted to provide an end-user with various important pieces of information and innovative services. In order for the end-user to access the information and services, the unique scan-able code must be scanned by a user device. In preferred embodiments, the code is scanned when the product (or more specifically the product packaging) is opened or otherwise removed from the preserved state.

For example, preserved state of a vacuum-packed product is modified when the packaging of the product is pierced and the product is exposed to oxygen in the atmosphere. In another example, preserved state of a dehydrated product is modified to a non-preserved state when rehydrated. In the non-preserved state, the product has a limited usage-life before the product becomes unfit for use. In most cases, the usage-life of a product is much shorter than the shelf-life of the product. When the code is scanned, the scanning device (also interchangeably referred to as an "end-user device") sends a notification to the central server that the state of the product has been modified. In step 206 the central server receives an electronic scanning notification from an end-user device, via a network such as a cellular data network, including a Modification Time where the modification time indicates a time of modification of the product, i.e. the time at which point the product was been modified from being in a preserved state to being in a non-preserved state.

As mentioned above, in preferred embodiments, the central server includes a memory such as a storage medium configured to store computer-readable instructions. Referring back to FIG. 4, in some embodiments, the memory includes a Usage-Life Timer 1104 or other, similar, timer or counter module. The usage-life timer is configured to run a counter for as period of time equal to an estimated usage-life of the specific product. Each product-unit has a dedicated usage-life timer 1104$a \ldots n$ that is configured according to the usage-life of the individual product-unit.

Instructions for the usage-life timer are loaded into memory and the counter is initiated by the processor. In some embodiments the timer is initiated in response to the notification from the end-user device. In some embodiments, the end-user is prompted to confirm that the product has been opened or readied and that the usage-life timer must be initiated. Confirmation that the code has been scanned by an end-user device triggers various events to take place.

Together with the code data, the end-user device provides additional information to the central server, including, at least, a user ID of device as well as a network address for the user device. The central server now has an end-user device with which to communicate.

Referring back to FIG. 2, in step 208 of the server process, the system calculates a usage expiration date for the product. The usage expiration date is calculated based on an estimated length of time the product is usable in the non-preserving state and the modification time. In preferred embodiments, one of the steps that the server initiates is step 210 where the server sends data to the end-user device including the shelf-expiration date of the product. In an optional embodiment, in step 250, the end-user device displays the shelf-life timer.

In a further step 212, the server sends the usage expiration date of the product to the end-user device. The usage expiration date is calculated based on the aforementioned estimated length of time the product is usable after modification (opening or preparation for use) and the modification time when the packaging was opened or the product modified, per end-user device notification. See below for a more detailed discussion regarding various services offered by the system in response to the server receiving the electronic notification from the end-user device. In one embodiment, the process includes an optional step 252 where the end-user device displays the usage life timer.

As mentioned briefly above, a product passes through many hands between manufacture and end-user use. For example, a medicine may be manufactured by a manufacturer located in a first country and then transferred to an import/export facility. The import/export facility ships the product to a corresponding facility in a second country. From there the product is then transported to a wholesaler for distribution in the second country. A national distributer may have multiple state-wide sub-distributers, each of which may be viewed as a wholesaler in their own right. Wholesalers service various local retailers. The end-user usually acquires the product from such a retailer. In some cases there may be more than one retailer. In other cases the wholesaler may also be the retailer. Therefore, the designation afforded to each entity or station along the supply chain is based on their subjective function in the given scenario and not necessarily the primary function of that entity in practice.

In preferred embodiments, the unique scan-able code is scanned at each station. Preferably, along with a notification of the code being scanned, the central server is also updated with additional information related to the scanning entity. For example, if the wholesaler scans the code, then the server may receive a notification including the name and geographic location of the wholesaler and any other relevant information the wholesaler can provide. In this manner, the central server is able to track the product as it progresses along the supply chain. A tracking feature of the system is described in greater detail below.

Batch Unit Codes

It is made clear that that even though unique codes for individual product units has been described to this point, the current method and system can equally or equivalently be applies to batch units. In general, each code is provided to a single product unit. But the same concept can be applied to a batch unit. Each batch unit can have a unique code relating to that specific batch. Just as a single bottle of pills includes a number of individual pills, so to a single shipping box contains a number of individual bottles of pills. To continue the analogy, just as the end-user is the individual that purchases and uses the single bottle of pills, so to the retailer that buys a shipping carton of bottles of pills is the "end-user" of the shipping carton in this case. Exemplarily, the "usage" of the retailer is the sale of all the product units in the shipping carton. The "usage expiration date" for the retailer is a date by which the retailer must sell all the units. Any product units not sold by the usage expiration date must be discarded. This is similar to a 'sell-by' date that appears on some products.

Extension of Usage-Life

To highlight a distinction between the known sell-by date and the usage expiration date discussed above, it is noted that a sell-by data is an approximated date based on various constants, such as the manufacturing date and the estimated shelf life. However, a sell-by date cannot be applied to a product whose shelf-life can be extended indefinitely, such as by a process of freezing or some other method of preservation. Only once the product has been removed from the preserving environment can a usage expiration date be calculated.

The following example will illustrate various important points. It is common practice to freeze or at least refrigerate produce such as potatoes and apples. A retailer (or wholesaler, for that matter) may freeze a product for a length of time much greater than the shelf life of the product in such a case, when the product is placed in refrigeration, according to the immediate invention, the code is scanned and a notification is sent to the central server to suspend the shelf-life counter (another approach is discussed elsewhere herein).

When the product is removed from refrigeration the product is scanned once again and the shelf-life counter is restarted in the server. The retailer's usage expiration date is now calculated based on the remaining product shelf life (once out of refrigeration) and the rules that dictate how long in advance of an expiration date a product may be sold. The usage counter is configured based on the aforementioned calculation and the server sets the counter running. A notification is sent to the retailer, including the currently-calculated usage expiration date, the data by which the retailer must either sell the product or dispose of it.

As discussed above, some perishable products, like certain medicaments and food stuffs keep fresh or viable for longer if stored in a refrigerated environment. For example, the shelf life of chicken eggs can be extended for about a month if the eggs are place in the refrigerator.

Referring back to FIG. 2, according to some embodiments, in an optional step 214 (the step is indicated as optional by the use of a broken-line border) the end-user is prompted to extend the usage life of the product h placing the product in a preferred storage environment (e.g. a cool storage locker, a fridge, a Ziplock® bag etc.). If the end-user decides to place the product in the preferred storage environment then the end-user responds to the prompt and sends a notification to the server. In step 216 the server receives the notification from the end-user device that the product is located in the preferred storage environment. In step 218 the server recalculates the usage expiration date based on the preferred storage environment. In step 220 the server sends a notification to the user device including a recalculated usage expiration date.

In general, each time a unique code or other indicia (which is operationally coupled to the product) is scanned by a scanning device, the scanning device sends an electronic scanning notification to the central server, indicating that the product code was scanned. In some embodiments, the scanning notification further includes at least a unique device identifier of the scanning device. In some embodiments, the electronic scanning notification also includes location data relating to a geographical location of the scanning device.

Tracking Feature

In some embodiments, the central server tracks the location and progress of the product, as it moves through the supply chain. In step 224 the system tracks the product based on the aforementioned location data included in the electronic scanning notification. In preferred embodiments, the unique code is scanned at each point along the change. As mentioned elsewhere, the unique code maps back to data entry stored on a server. In some embodiments, the unique code is a QR code that instructs the device that scans the code to connect with the central server. The code can further be configured to send the location data of the scanning device back to the server when scanned. In this way, the central server is updated with the location of the product each time the code is scanned. In some embodiments, a Tracking Module 117 in the central server is configured to track the product. Tracking the product is useful for a variety of reasons, some of which include: ensuring that product goes to the desired location, preventing fraud, assisting law enforcement in tracking stolen goods etc.

Resupply Requests

One optional feature afforded by the immediate system is the option to request a resupply of the product, when the product is nearly expended or near an expiration date. The term "resupply" is used herein to refer to any manner of replenishing a supply of the same product with a replacement product of the same type. The term is used interchangeably with the other common phrases such as "refill" (which usually applies to a medical prescription) and "restock" as well as other similar terms or variations thereof.

Figure 3:
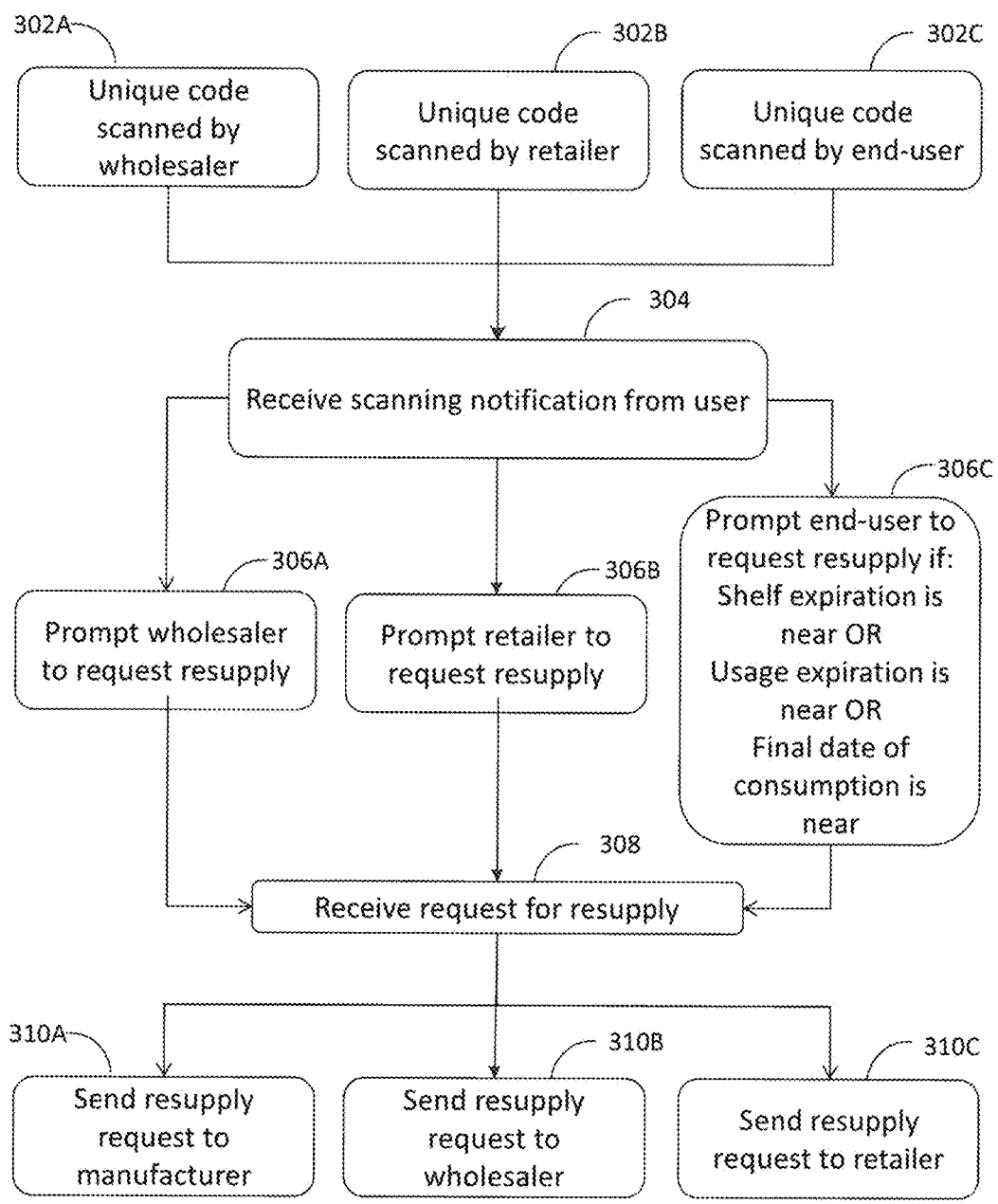
FIG. 3 is a resupply flow chart for three use-cases.

FIG. 3 illustrates a resupply flow chart for three use-cases. In a preferred embodiment of the invention, the server sends a resupply notification when the product is nearly spent. In steps 302A-302C the unique codes are scanned by the user. In step 302A the user is a wholesaler. In step 302B the user is a retailer. In step 302C the user is an end-user. In other embodiments, there may be some other entity in the supply change. In some embodiments, location data is included in the scan notification sent to the server and provides the server with an identification of the user. Additionally or alternatively the user can be identified by unique device identifier of the scanning device.

In step 304 the central server receives notification that the unique code was scanned. In one exemplary embodiment, the notification is received from the wholesaler. Exemplarily, the wholesaler scans the code on the shipping container of product units when the supply arrives (possibly in a large shipping container with a unique code on the container). The system is now informed that the wholesaler has a certain inventory of product units. In some cases the wholesaler opens the container and sells one or more shipping cartons to various retailers. When the wholesaler ships a supply to the retailer, the code on each carton is scanned. The server is notified bow many cartons of the container have been sold and calculates the remaining supply and when the wholesaler is or will be low on supply.

In step 306A the server sends a notification to the wholesaler indicating that the inventory is low. The server queries the wholesaler as to whether the wholesaler would like to request a resupply from the manufacturer. The queries may be in the form of a prompt, such as: "Would you like to request a resupply from the manufacturer? Y/N".

If the wholesaler agrees to request a resupply then a notification is sent to the central server. In step 308 the server receives the notification for resupply from the wholesaler. In step 310A the server sends a request to the manufacturer to resupply the wholesaler. Of course, various detailed must be included in the request, both from the wholesaler and from the server. For example, an exact inventory size is needed. A preferred date for receiving the new supply may also be requested. Issues of payment and verification are also needed fix a successful transaction to take place, etc. It is made clear that all the intervening steps and activities are considered part of the scope of the invention.

A resupply request for a retailer is handled in a similar way to which the resupply request is handled for the wholesaler. As mentioned above, in step 304 the central server receives notification that the unique code (e.g. of a shipping carton) was scanned. In one exemplary embodiment, the notification is received from the retailer. Exemplarily, when the retailer sells one of the product units from the carton to the end-user, the code (e.g. on the product unit) is scanned at the POS. The server calculates the remaining supply and when the retailer is or will be low on supply. In step 306B the server sends a notification to the retailer indicating that the inventory is low. The server queries the retailer as to whether the retailer would like to request a resupply from the wholesaler. The queries may be in the form of a prompt, such as: "Would you like to request a resupply from the wholesaler? Y/N".

If the retailer agrees to request a resupply then a notification is sent to the central server. In step 308 the server receives the notification for requesting resupply from the retailer. In step 310B the server sends a request to the wholesaler to resupply the retailer. Of course, various detailed must be included in the request, both from the retailer and from the server. For example, an exact inventory size is needed. A preferred date for receiving the new supply may also be requested, issues of payment and verification are also needed for a successful transaction to take place, etc. It is made clear that all the intervening steps and activities are considered part of the scope of the invention.

As with the wholesaler and retailer, a similar process occurs with the end-user. As mentioned above, in step 304 the central server receives notification that the unique code was scanned. In one exemplary embodiment, the notification is received from the end-user, in preferred embodiments of the invention, the end-user scans the code when the product is opened or prepared. Specifically, when the product is removed from the preserving environment, or when the preserving environment is compromised. For example, when a vacuum-sealed medication is opened, the preserving environment is compromised as air comes into contact with the medication. The same principle is true for opening a nitrogen-filled packet of potato chips (crisps) or a can of peas.

When an end-user uses a medicine or other pharmaceutical on a regular basis, such as a vitamin or prescribed medication, the product unit usually suffices for a predetermined amount of time, such as a month. The medicine may be, for example, a bottle of 30 pills that lasts a month. The data entry relating to the unique product unit preferably includes the number of individual members in the product unit (e.g. the number of pills in the bottle) or a measurement of the liquid or granular substance therein. Further, the data entry preferably includes a dosage regimen for the particular medicament or pharmaceutical. As such, when the end-user scans the product's unique code, the central server calculates how long the medicament will last before a replacement is necessary, assuming that the end-user adheres to the dosage regimen.

A notification is sent to the end-user before the product is finished (or goes bad, etc.). In one embodiment, the notification is sent a predefined amount of time prior to the [assumed] complete consumption of the product (e.g. based on the calculation discussed above). In another embodiment, the notification is sent a predefined amount of time before the usage expiration date. In some cases the final date of consumption is considered the expiration date. In some embodiments, the notification is sent a predefined amount of time before the shelf-life expiration date.

Two examples are discussed to illustrate different possibilities. The first example is a nicotine patch. A nicotine patch is sealed in a preserving environment at the time of manufacture. The shelf life of the patch is contingent on the preserving environment not being compromised. When the end-user wishes to apply the patch, the unique code is first scanned. Opening the packaging exposes the medicament to the environment. Applying the patch brings the medicament into contact with the skin which absorbs the medicament. If the patch is a 10-day patch, then the usage expiration date is ten days after application. After ten days, the patch is used up and empty. In this case, the usage expiration date is the same as the final date of consumption.

The second example is a liquid antibiotic. The antibiotic is manufactured as powder and vacuum-sealed into bottles. At the pharmacy, when a unit is purchased, the pharmacist "makes up" the medicine by breaking the seal and adding the required amount of distilled water. The medicine, in liquid form, is effective for up to a month in refrigeration. Thereafter the medicament loses its efficacy and must not be used. The usage expiration date for the specific bottle is calculated based on the usage-life of the medicament and the time when the pharmacist or end-user scans the unique code to notify the server that the medicine is being hydrated into the liquid suspension. The data entry linked to the unique code includes the information regarding the usage-life of the suspension once it has been made up. According to the flow chart of FIG. 1, the server sends a notification of the usage expiration date to the end-user.

At the same time, the dosage regimen is either known to the system (e.g. stored in the data entry, received from the manufacturer server etc.) or uploaded to the server from the POS (e.g. the pharmacist) or other $3^{rd}$ party source. The dosage regimen may indicate, for example, that the end-user must take 10 ml of liquid (dosage) three times a day (regimen). According to the dosage regimen, the bottle will be finished within 5 days. In this case, the usage expiration date (one month) and the date of [assumed] final consumption (5 days) are very different.

When the server receives the scan notification from the end-user for from the POS, as in the example above), the server calculates when the end-user will be low on supply. The end-user will need a new supply when one or more of the following conditions are fulfilled: the shelf-life expiration date is within a first predefined amount of time (e.g. within a few days), the usage expiration date is within a second predefined amount of time, and the date of final consumption is within a third predefined amount, of time. Of course, any of the aforementioned predefined amounts of time may be equal to each other.

In step 306C the server sends a notification to the end-user indicating that a refill will be needed soon. The server queries the end-user as to whether the end-user would like to request a resupply from the retailer (e.g. the pharmacy). The queries may be in the form of a prompt, such as "Do you need to refill your prescription? Y/N".

If the end-user agrees to request a resupply then a notification is sent to the central server. In step 308 the server receives the notification for requesting resupply from the end-user. In step 310C the server sends a request to the retailer to refill or otherwise resupply the end-user. Of course, various detailed must be included in the request, both from the end-user and from the server. For example, the retailer may need a new prescription from the doctor or the like. Issues of payment and verification may also be needed for a successful transaction to take place. It is made clear that all the intervening steps and activities are considered part of the scope of the invention.

Figure 5:
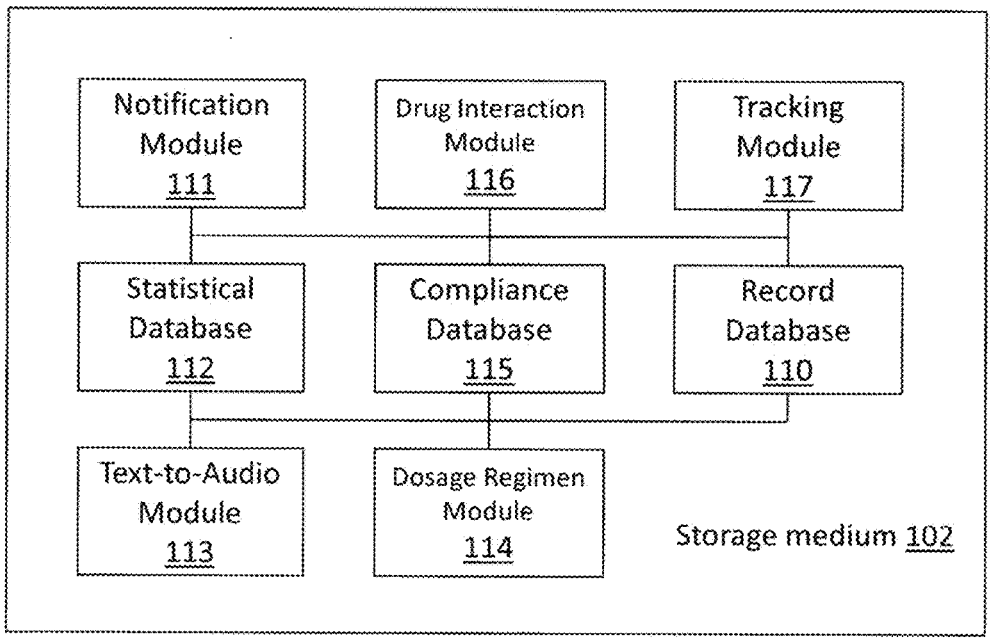
FIG. 5 is a partial block diagram of exemplary databases, modules and engines that may be included in the central server.

FIG. 5 illustrates a partial block diagram of exemplary databases, modules and engines that may be included in the central server. One or more of the databases, modules and engines (collectively referred to herein as modules) may be included in one or more embodiments or configurations of the central server. In the Figure, storage medium 102 is partially depicted, including some of the modules which are germane to the invention in general and the features and services discussed here-below in particular.

A Notification Module 111 is stored on storage medium 102 and adapted to manage any and all types of notifications sent front the server. All notification processes may be handled within the central server or by one or more dedicated servers that are collocated or remotely located. The notification module is adapted to send all means of electronic notifications including but not limited to: SMS messages, entails, application-based alerts, calendar reminders, audio messages (digital and analog) and system messages.

Warnings

In some embodiments, the central server is configured to compare the usage expiration date of a product with the shelf-life expiration date of that product. If the server determines that there is a possibility that the product will be used after the shelf-life expiration date—based at least on the usage expiration date then, in step 222 (FIG. 2) the central server issues a warning notification to the end-user device that scanned the unique code.

In some embodiments, a similar warning can be sent to a care facility, such as a local hospital or poison center and the like, notifying medical personnel and/or municipal authorities, that the product may be used after the shelf-life expiration date. The system may be configured to notify different care-giving entities (e.g. a caregiver, a relative, a primary care physician etc.) to those mentioned here-before, but any such arrangement or configuration is considered to be included within the scope of the invention. In other embodiments, the server includes a Statistical Database 112 that stores various pieces of information. The information stored on the database may be used in various statistical analyses, for monitoring purposes, for data mining purposes and/or other information-based processes. In one embodiment, information regarding products that are being used alter the expiration data may be included in the data stored in the Statistical Database.

Prescribing Information (Prescription Pamphlet)

When a product such as a medicament has been scanned by an end-user, then in step 226 the scan able code maps hack to a network address corresponding to computer, e.g. the central server, which includes at least the processor and memory. As discussed elsewhere, in some embodiments the memory includes a records database 110 stored thereon. As also mentioned elsewhere, the database includes many data entries, one for each unique scan-able code, including one data entry corresponding to the unique scan-able code/indicia that was scanned by the end-user.

If the data entry pertains to a medicament, then in preferred embodiments, the data entry includes prescribing information relevant to the medicament. Prescribing information is otherwise known as patient information and is usually provided on a patient information or prescribing information leaflet. In one embodiment, the system includes a feature for ensuring, or at least encouraging, the user to review the information.

In one embodiment, the central server or a client side software or mobile application that works in tandem with, the central server prompts the end-user to review the prescribing information. In one exemplary embodiment, in step 228, the server prompts the end-user to display the prescribing information on the end-user device. In another exemplary embodiment, the server prompts the end-user to play back an audio rendition of the prescribing information. For example, in step 230 the server prompts the end-user to initiate a text-to-voice conversion of the prescribing information. In one embodiment, the central server includes a Text-to-Audio Module 113 which is configured to convert the text of the prescribing information (that is stored in the data entry, or on a separate server) into audio data.

Figure 5A:
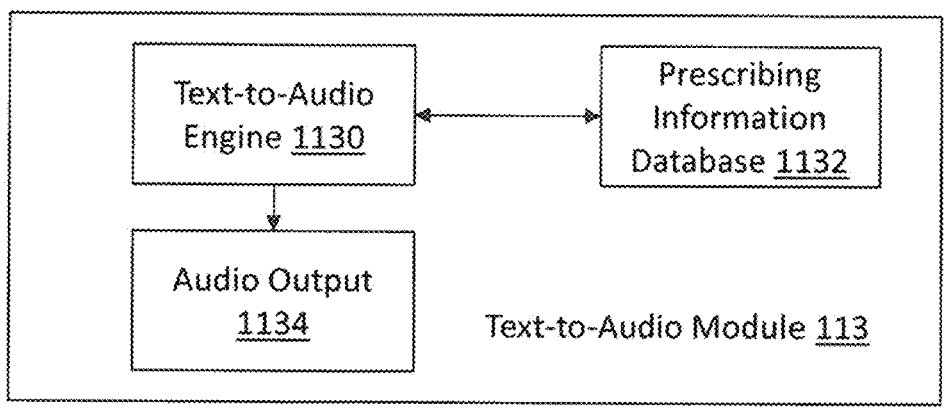
FIG. 5A is an exemplary embodiment of the Text-to-Audio Module.

FIG. 5A illustrates an exemplary embodiment of the Text-to-Audio Module. In some embodiments the prescribing information is provided to the central server together with the manufacturing information (discussed above), e.g. by the manufacturer server. Additionally or alternatively, the prescribing information may be accessed from another source such as a dedicated server that stores such information or a website that contains, or is configured to retrieve, the prescribing information (e.g. a website the employs a search engine that locates and retrieves such information from various manufacturers).

In one embodiment the prescribing information is stored in a dedicated prescribing information database 1132. The database is indexed as is known in the art. In preferred embodiments, each data entry or record includes the relevant index identifier for the prescribing information that is relevant to the product of that record. The module includes a Text-to-Audio Engine 1130. In step 232 (FIG. 2) the engine accesses or retrieves the text data of the prescribing information from prescribing information database 1132 and performs a text-to-audio conversion of the prescribing information and outputs audio data 1134. In step 234 the audio data is transferred to the end-user device.

Once the text is rendered into audio output, the user cart play the audio output on the end-user device. In some embodiments, the server is configured to prevent the user from receiving additional information and/or services until the prescribing information has been reviewed or played.

Dosage Regimen

In some embodiments, the data entry additionally or alternatively includes a dosage regimen for the specific product bearing the unique scan-able code related to the data entry. In one embodiment, the central server includes a Dosage Regimen Module 113.

Figure 5B:
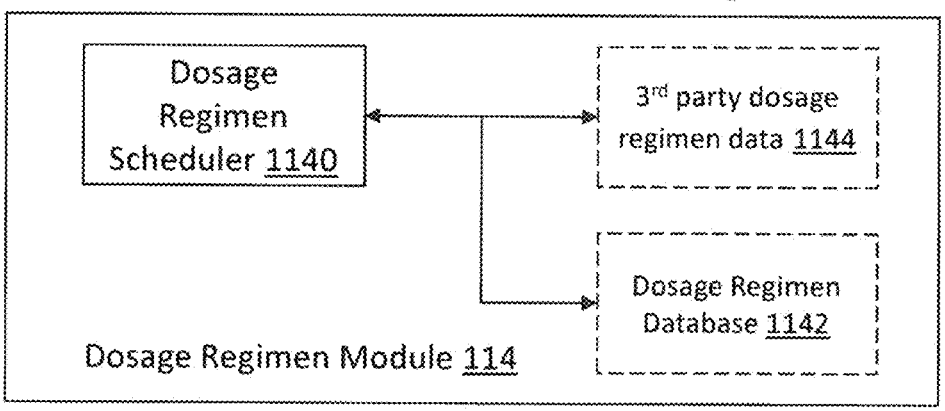
FIG. 5B is an exemplary embodiment of the Dosage Regimen Module.

In some cases, there is a predefined dosage regimen for the product. In such cases, the dosage regimen information is provided to the central server together with the manufacturing information (discussed above). Additionally or alternatively, the dosage regimen information may be accessed from another source such as a dedicated server that stores such information or a website that contains, or is configured to retrieve, the dosage regimen information (e.g. a website the employs a search engine that locates and retrieves such information from various manufacturers). FIG. 5B illustrates an exemplary embodiment of the Dosage Regimen Module 114. In some embodiments, the dosage regimen data is not stored in the data entry but rather in a separate dosage regimen database 1142 (that may or may not be stored on a separate server). Preferably the database is indexed as is known in the art. In such cases the data entry at least includes a pointer, index identifier or other manner of digitally directing the server and/or end-user device to the relevant information. The same is true for all the databases, modules and engines of the system.

In other cases (perhaps the majority of cases in fact), the dosage regimen is prescribed together with the product/medicament, for example, by a doctor. In step 236 the system receives the dosage regiment from a third party. In such cases, the doctor (or other person or entity instructing the end-user to take/administer the product) provides instruction on the amount of medicine to take (dosage) and how often to take the prescribed amount (regimen). In some places, these instructions are handwritten by the doctor (or other caregiver, advisor etc.) and the product dispenser likewise copies these instructions to the end-user.

In more computer-oriented environments, the instructions are provided by the caregiver in printed form or electronic form or scan-able form e.g. a barcode that has the requisite dosage regimen encoded therein). The product dispenser (e.g. a retailer such as a pharmacist or dispenser of herbal medicine etc.) likewise enters the instructions into a terminal at the Point of Sale (POS). As discussed above, the retailer scans the unique indicia/code at the time of sale to the end-user, and the POS terminal communicates with the central server over a network (e.g. the Internet) and sends the electronic notification relating to the unique code to the server. In preferred embodiments, the POS terminal further sends the dosage regimen information to the central server. In such a manner, the system receives the dosage regimen information from a third party. In other exemplary embodiments, the dosage regimen is received directly from the doctor. In preferred embodiments, the $3^{rd}$ party dosage regimen data 1144 is stored in the relevant data entry, or otherwise logically linked thereto.

However the dosage regimen data is received or stored, the end-user, according to a preferred feature of the invention, is able to access or view the necessary dosage regimen data using the end-user device. In some embodiments, the system (server and/or client software/mobile application) includes a Dosage Regimen Scheduler 1140 that accesses the dosage regimen data and provides the end-user with a dosage regimen schedule, preferably including one or more reminders to take the medicine. In step 238 the notification module sends a reminder notification to the end-user, where the reminder relates to the dosage regimen.

For example, the reminder may be a calendar reminder that sounds an alarm on a desktop computer or handheld smartphone and the like, or the reminder may be an SMS message to a cellphone or an email message to an email client on a computing device. The reminders may be sent by the central server or a separate, dedicated email server, an automated SMS service or other entity configured to send electronic notifications (including automated/recorded audio messages). If the medicament must be administered in a specific facility or by trainer personnel, a dedicated call center may be notified or may contact the end-user to remind them of a scheduled appointment. All of the aforementioned methods of notification are managed by Notification Module 111 and the servers, clients, call centers etc. are collectively referred to as notification module 111.

In some embodiments, the data entry relating to the scan-able code on the product further includes compliance information detailing whether and in what way the end-user has or has not complied with the dosage regimen. In some embodiments, the compliance information is alternatively or additionally stored in a Compliance Database 115. As with the other databases, modules and engines, the compliance database may be stored on the storage medium of the central server or may be stored on a separate storage medium on a separate server.

In a preferred embodiment, the Dosage Regimen Scheduler (or some other equivalent system) prompts the end-user for confirmation (step 240, FIG. 2) that the specified dosage of the medicament has been taken or administered. For example, the mobile application presents a prompt on the handheld screen asking whether the medicine has been taken. When the end-user confirms that the medicament has been taken/administered, the end-user device sends a notification to the server indicating that the end-user has complied with the dosage regimen. The compliance information is accordingly updated (step 242, FIG. 2).

In some embodiments the system initiates a counter once the notification reminder has been sent the end-user. If a predefined amount of time elapses without receiving confirmation then, preferably, a second notification is sent (step 244, FIG. 2). The counter is reinitiated according to the same, or another, predefined amount of time. Once the second time period has also elapsed without receiving confirmation, in preferred embodiments, the system sends a non-compliance message to a predefined entity (step 246, FIG. 2).

Exemplarily, the predefined entity may be a primary caregiver, such as a relative or a doctor, or some other care facility (e.g. a medical call center). Additionally or alternatively, the non-compliance message is sent to the compliance database 115 and/or the statistical database 112 that stores information that can be used for statistical analysis and/or other forms of data mining and manipulation.

Drug Interaction Checker

As with the dosage regimen information, in preferred embodiments, the innovative system includes drug interaction data. For example, the data entry pertaining to a specific medicine can include the data. Drug interaction information is information that details various potential interactions between one drug and another or other drugs. Usually a primary care physician is aware of the various drugs prescribed to a patient and takes care to ensure that the prescribed drugs do not interact negatively with each other. Unfortunately, it is not uncommon that one care giver prescribes a first drug and another care giver prescribes a second drug, where each care giver is unaware that the other drug has been prescribed to the patient. The unwitting patient then takes both drugs concurrently and the undesired interaction results in a negative outcome.

The immediate invention provides a service to check the potential drug interactions of various drugs scanned by the end-user. While scanning the unique code only indicates that the end-user intends to begin using or taking the drug, the system includes at least the usage expiration date of the drug and/or the shelf-life expiration date. In some embodiments, the system further includes the dosage regimen information for the drug. As such, a Drug Interaction Module 116 on the server (i.e. computer-readable instructions stored on the non-volatile storage medium and adapted to be executed by the processor) is configured to calculate which medicaments are supposed to be taken concurrently. The module is also configured to calculate which medicaments have been opened but neither the usage expiration date nor the shelf-life expiration date has been reached.

Figure 5C:
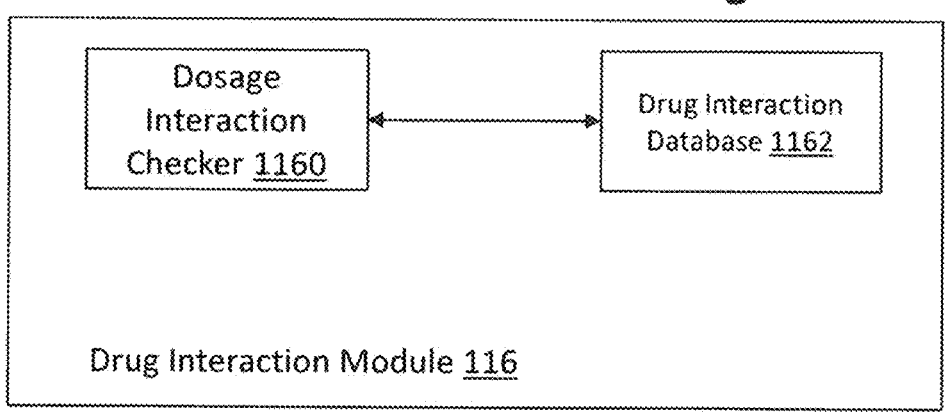
FIG. 5C is a block diagram of an exemplary embodiment of the Drug Interaction Module.

FIG. 5C illustrates a block diagram of an exemplary embodiment of the Drug Interaction Module 116. In exemplary embodiment, the potentially concurrent drugs are entered into a Drug Interaction Checker 1160 that looks up the drug interactions of each of the medicaments in a drug interaction database 1162 and crosschecks the drugs for undesired interactions (step 248, FIG. 2). If an undesired interaction is found, Drug Interaction Module 116 instructs the notification module 111 to send a notification (e.g. sound an alarm etc.) to the end-user device instructing the end-user not to use the medicine until discussing the conflict with an authorized medical practitioner (or similar source). In some embodiments, the notification module additionally or alternatively sends the notification to primary caregiver and/or a care facility (step 249, FIG. 2).

Another possible configuration is of the system is shown in FIG. 6. FIG. 6 is a block diagram of client side devices interacting with a server computer. In the figure, server 100 is depicted in communication with a client side computing device 600 via the network 150. The system components can be found in the server computer and at least some of the same or similar components or corresponding, components can be found in the client side computing device, including at least a non-volatile computer-readable storage medium 602, a processing unit 604 and a memory 606. The client side computing device can have installed thereon a software application or a mobile application programmed with instructions to execute the above detailed processes. The client side computing device 600 further includes a scanning component 650. The scanning component may be an imaging sensor (e.g. a camera), a Bluetooth™ transceiver, a NFC component, an RFID component, an Infrared component, a WiFi component and/or any other known wireless communications component known in the art. Alternatively or additionally the computing device may be coupled to such a device in a wired or wireless manner (e.g. a PC wired to a web camera or wirelessly coupled to a scanning device).

FIG. 7 illustrates a flow diagram of an embodiment of the client-side process. In one embodiment, the client side computing device 600, in communication with a server computer 100 over a network 150, has program code stored there that when executed, in response to the scanning component 650 scanning a unique code on the product (step 700), instructs the processing unit to:

Step 702—send an electronic usage notification, via the network, to the server computer. The usage notification includes a Modification Time which indicates a time of modification of the product from a preserved state to a non-preserved state.

Step 704—receive an electronic manufacture notification, via the network, including a Manufacturing Time. The manufacturing time indicates a time of manufacturing of the product.

Step 706—calculate a shelf-life expiration date based on an estimated shelf-life and the aforementioned manufacturing time of the product.

Step 708—calculate a usage expiration date based on an estimated length of time the product is usable in the non-preserving state and the modification time.

In some embodiments, the client computing device is further configured to:

Step 710—display a usage timer. The usage timer is configured to run from the modification time for a length of time substantially equal to the estimated length of time the product is usable in the non-preserved state.

In some embodiments the client computing device is further configured to:

Step 712—display a shelf-life timer. The shelf-life timer is configured to run from the manufacturing time for a length of time substantially equal to the estimated shelf-life of the product.

It is made clear that the client computing device, in some embodiments, is further configured to provide the services and features described about with relation to the server.

While the invention has been described with respect to a limited number of embodiments, it will be appreciated that many variations, modifications and other applications of the invention may be made. Therefore the claimed invention as recited in the claims that follow is not limited to the embodiments described herein.

What is claimed is:

1. A method for monitoring a life-cycle of a product by a server including a memory and processor, the method comprising:
storing, by the server, unique identifiers in a database as unique codes via a fixed memory offset using a hand held scanning device and logically links the unique identifiers to the unique codes;
linking, by the server, a plurality of related data tables based on a type of the unique identifiers in key fields;
indexing, by the server, and using the key field, the database according to the unique identifiers defined by the key field to speed data retrieval operations data tables of the unique codes;
sorting, by the server, the unique codes according to a known order to simplify the lookup process;
mapping, by the server, the unique code maps back to data entry stored on the database;
logically linking a set of usage life timers respectively to said unique codes, each usage life timer being a module stored on the memory and uniquely associated with a respective unique identifier represented as a unique indica on a product unit of a set of product units;
receiving, at the server, an electronic scanning notification from said hand-held scanning device, via a network, including a modification time, said modification time indicating a time of modification of the product from a sealed state to an open state, said scanning notification being generated by said hand-held scanning device after scanning said unique indicia on one product unit of the product;
initiating, by the processor, a specific usage life timer of said set of usage timer modules stored on the memory, said specific usage life timer being uniquely logically linked with said unique code linked to said unique identifier represented by said unique indicia scanned by said scanning device, said specific usage life timer being configured to run for a length of time substantially equal to a predefined length of time the product in said one product unit is usable after said modification time in said unsealed state, said predefined length of time being stored in said unique data entry stored on said database;
sending an expiration notification to said scanning device before or when said specific usage life timer module finishes running.

2. The method of claim 1, wherein said scanning device is selected from a group of scanning devices belonging to: a manufacturer, an importer, a wholesaler and a retailer.

3. The method of claim 2, further comprising:
prompting said wholesaler to send a resupply request when inventory of the product is low;
receiving said resupply request from said wholesaler; and
sending said resupply request to said manufacturer.

4. The method of claim 2, further comprising:
prompting said retailer to send a resupply request when inventory of the product is low;
receiving said resupply request from said retailer; and
sending said resupply request to said wholesaler.

5. The method of claim 1, further comprising:
tracking the product based on location data, said location data relating to a geographical location of said scanning device and included in said electronic scanning notification.

6. The method of claim 1, further comprising:
prompting an end-user to extend a length of said predefined usage life by placing said one product unit of the product in a preferred storage environment;
receiving notification from said scanning device that said one product unit is located in said preferred storage environment;
adding time to said one usage life timer based on said preferred storage environment; and
sending notification to said scanning device including a time said one usage life timer is due to finish running.

7. The method of claim 1, wherein said data entry includes at least one of: prescribing information, a dosage regimen, and compliance information.

8. The method of claim 7, further comprising:
prompting, by the server, an end-user to display said prescribing information on said scanning device.

9. The method of claim 7, further comprising:
prompting, by the server, an end-user to initiate a text-to-audio conversion of said prescribing information;
converting, by the server, said prescribing information to an audio output of said prescribing information; and
transferring said audio output to said scanning device.

10. The method of claim 7, further comprising:
receiving said dosage regimen from a third party.

11. The method of claim 7, further comprising:
sending a reminder notification to said scanning device when a dosage of the product is due to be taken, said reminder notification configured according to said dosage regimen.

12. The method of claim 11, further comprising:
prompting said scanning device for confirmation that said dosage has been taken;
updating said compliance information when said confirmation is received; and
sending an additional said reminder notification to said scanning device if a predefined time-period has elapsed prior to receiving said confirmation.

13. The method of claim 12, further comprising:
sending a non-compliance message to a predefined entity if a second predefined time-period has elapsed prior to receiving said confirmation.

14. The method of claim 1, further comprising:
checking for drug interaction between the product in said one product unit and each of at least one additional medicament for which a respective electronic usage notification has been received from said scanning device.

15. The method of claim 1, further comprising:
displaying said one usage life timer on a display of said scanning device.

16. The method of claim 1, further comprising:
providing a set of shelf life timers, each of said set of shelf life timers being a module stored on the memory of the server;
receiving, at the server, an electronic manufacture notification from a manufacturer, via said network, including a manufacturing time of the product;
initiating by the processor, in response to said manufacture notification, one shelf life timer of said set of shelf life timers, said one shelf life timer being associated with said unique indicia of said one product unit and configured to run for a length of time substantially equal to a predefined estimated shelf-life of the product in said one product unit; and
sending said expiration notification on or before said one shelf life timer finishes running, if said one shelf life timer finishes running before said one usage life timer.

17. The method of claim 16, further comprising:
prompting an end-user to request a replacement for said one product unit of the product when said one product unit fulfils a condition selected from the group including: said one shelf life timer is due to finish running within a first predefined number of days, said one usage life timer is due to finish running within a second predefined number of days, and a final date of consumption of the product is within a third predefined number of days.

18. The method of claim 17, further comprising:
receiving said product replacement request, and
sending said product replacement request to said retailer.

19. The method of claim 16, further comprising:
sending a usage warning notification if said one usage life timer is due to finish running later than said one shelf life timer, said usage warning notification including a warning message, wherein said usage warning notification is sent to at least one of: said scanning device, a care-giving entity, and a statistical database.

20. The method of claim 16, further comprising:
displaying said one shelf life timer on a display of said scanning device.

21. A system for monitoring a life-cycle of a product unit, the system comprising:
a server computer including a memory and processor, said memory having stored thereon:
unique identifiers in a database as unique codes via a fixed memory offset using a hand held scanning device, the server logically links the unique identifiers to the unique codes and linking, by the server, a plurality of related data tables based on a type of the unique identifier in key fields and indexes using the key field, the database according to the unique identifiers defined by the key field to speed data retrieval operations data tables for the unique codes and sorts the unique codes according to a known order to simplify the lookup process, wherein said unique code maps back to data entry stored on the database;
a set of usage life timers, each usage life timer being a module stored on the memory and uniquely logically linked with a respective unique identifier represented as a unique indicia on a product unit of a set of product units of the product and adapted to run for a length of time substantially equal to a predefined length of time the product in said uniquely associated product unit is usable in a non-preserved state; and
a hand-held client computing device held by a user with access to one product unit of said set of product units, said client computing device including a scanning component, a processing unit and a memory, said server computer communicable with said client computing device over a network, said memory having program code stored thereon that when executed, in response to said scanning component scanning a unique indicia representing a unique identifier on said one product unit of said set of product units, instructs said processing unit to:
send an electronic usage notification, via said network, to said server computer, said usage notification including a modification time indicating a time of modification of said one product unit from a preserved state to a non-preserved state, said usage notification causing one usage life timer of said set of usage life timers, which is uniquely logically linked with said unique identifier represented by said unique indicia on said one product unit, to be initiated by said processor, said one usage timer configured to run from said modification time for a length of time substantially equal to said predefined length of time the product in said one product unit is usable in said non-preserved state; and
wherein said server is adapted to send a notification to said client computer device before or when said one usage life timer finishes running.

22. The system of claim 21, wherein said memory having program code stored thereon that when executed, instructs said processing unit to:
display on said client device, either said one usage life timer or said one shelf life timer, associated with said one product unit, depending on which of said timers finishes running first.

23. The system of claim 21, further comprising:
a set of shelf life timers associated with said corresponding set of product units of the product, each shelf life timer being a module stored on the memory and configured to run for a period of time equal to a shelf life of a respective product unit associated therewith;
wherein said server is adapted to send said notification to said client computer device before or when one shelf life timer, associated with said one product unit, finishes running prior to said one usage life timer finishing to run.

24. A method for monitoring a life-cycle of a product by a server including a memory and processor, the method comprising:
storing, by the server, unique identifiers in a database as unique codes via a fixed memory offset using a hand held scanning device and logically links the unique identifiers to the unique codes;
linking, by the server, a plurality of related data tables based on a type of the unique identifier in key fields;
indexing, by the server, and using the key field, the database according to the unique identifiers defined by the key field to speed data retrieval operations data tables for the unique codes;
sorting, by the server, the unique codes according to a known order to simplify the lookup process;
mapping, by the server, the unique code maps back to data entry stored on the database;
logically linking a set of usage life timers respectively to said unique codes, each usage life timer being a module stored on the memory and uniquely associated with a respective unique identifier represented as a unique indicia on a product unit of a set of product units;
receiving, at the server, an electronic scanning notification from said hand-held scanning device, via a network, including a modification time, said modification time indicating a time of modification of the product from an unprepared state to a prepared state, said scanning notification being generated by said hand held scanning device after scanning said unique indicia on one product unit of the product;
initiating, by the processor, a specific usage life timer of said set of usage timer modules stored on the memory, said specific usage life timer being uniquely logically linked with said unique code linked to said unique identifier represented by said unique indicia scanned by said scanning device, said specific usage life timer being configured to run for a length of time substantially equal to a predefined length of time the product in said one product unit is usable after said modification time in said prepared state, said predefined length of time being stored in said unique data entry stored on said database;

sending an expiration notification to said scanning device before or when said specific usage life timer module finishes running.

\* \* \* \* \*